US008234680B2

(12) United States Patent
Da Palma et al.

(10) Patent No.: US 8,234,680 B2
(45) Date of Patent: Jul. 31, 2012

(54) CREATION AND USE OF TEST CASES FOR AUTOMATED TESTING OF MEDIA-BASED APPLICATIONS

(75) Inventors: William V. Da Palma, Coconut Creek, FL (US); Brien H. Muschett, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 1786 days.

(21) Appl. No.: 11/277,047

(22) Filed: Mar. 21, 2006

(65) Prior Publication Data

US 2007/0250882 A1    Oct. 25, 2007

(51) Int. Cl.
*H04N 7/173* (2011.01)
(52) U.S. Cl. .......................................................... 725/93
(58) Field of Classification Search .................. None
See application file for complete search history.

(56) References Cited

U.S. PATENT DOCUMENTS

| | | | |
|---|---|---|---|
| 6,425,096 B1 | 7/2002 | Liese et al. | |
| 6,587,969 B1 | 7/2003 | Weinberg et al. | |
| 6,615,166 B1 * | 9/2003 | Guheen et al. | 703/27 |
| 6,697,964 B1 | 2/2004 | Dodrill et al. | |
| 6,721,404 B1 | 4/2004 | Lashley et al. | |
| 6,865,692 B2 | 3/2005 | Friedman et al. | |
| 7,412,532 B2 * | 8/2008 | Gondhalekar et al. | 709/231 |
| 2002/0078440 A1 * | 6/2002 | Feinberg et al. | 725/9 |
| 2003/0126521 A1 | 7/2003 | Radestock | |
| 2004/0019822 A1 | 1/2004 | Knapp, III | |
| 2004/0088602 A1 * | 5/2004 | Cohen et al. | 714/38 |
| 2004/0199822 A1 | 10/2004 | Kramer et al. | |
| 2005/0132261 A1 | 6/2005 | Da Palma et al. | |
| 2005/0166094 A1 * | 7/2005 | Blackwell et al. | 714/38 |
| 2005/0193269 A1 * | 9/2005 | Haswell et al. | 714/38 |
| 2005/0283752 A1 * | 12/2005 | Fruchter et al. | 717/100 |
| 2006/0155398 A1 * | 7/2006 | Hoffberg et al. | 700/86 |

OTHER PUBLICATIONS

Empirix, Inc. VoIP, Hammer suite of solutions for Network Testing & Monitoring, http://www.empirix.com/default.asp?action=category&ID=21, accessed Feb. 16, 2006, 9 pages.

* cited by examiner

*Primary Examiner* — Joseph P Hirl
*Assistant Examiner* — An Nguyen
(74) *Attorney, Agent, or Firm* — Cuenot, Forsythe & Kim, LLC

(57) ABSTRACT

A method for testing an automated interactive media system. The method can include establishing a communication session with the automated interactive media system. In response to receiving control and/or media information from the automated interactive media system, pre-recorded control and/or media information can be propagated to the automated interactive media system. The pre-recorded control and/or media information can be recorded in real time.

10 Claims, 2 Drawing Sheets

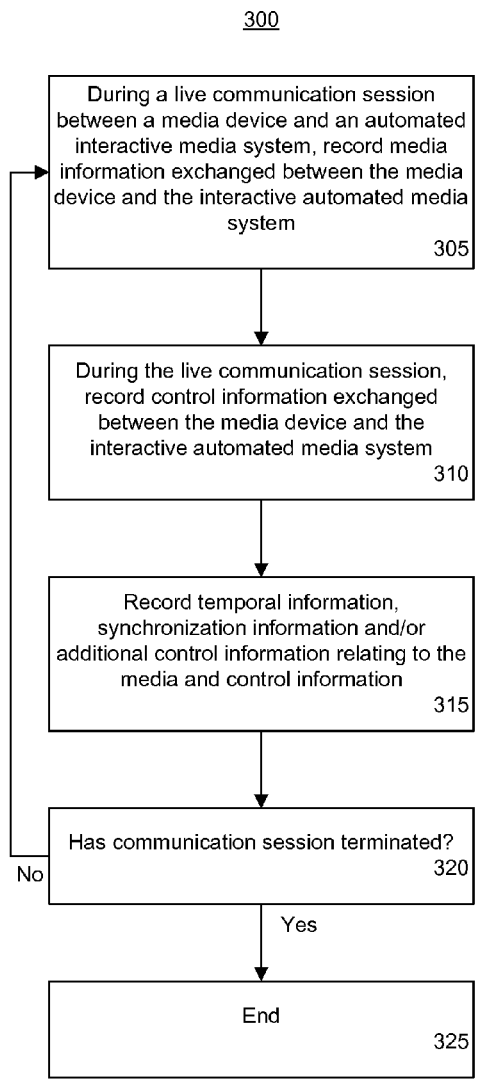
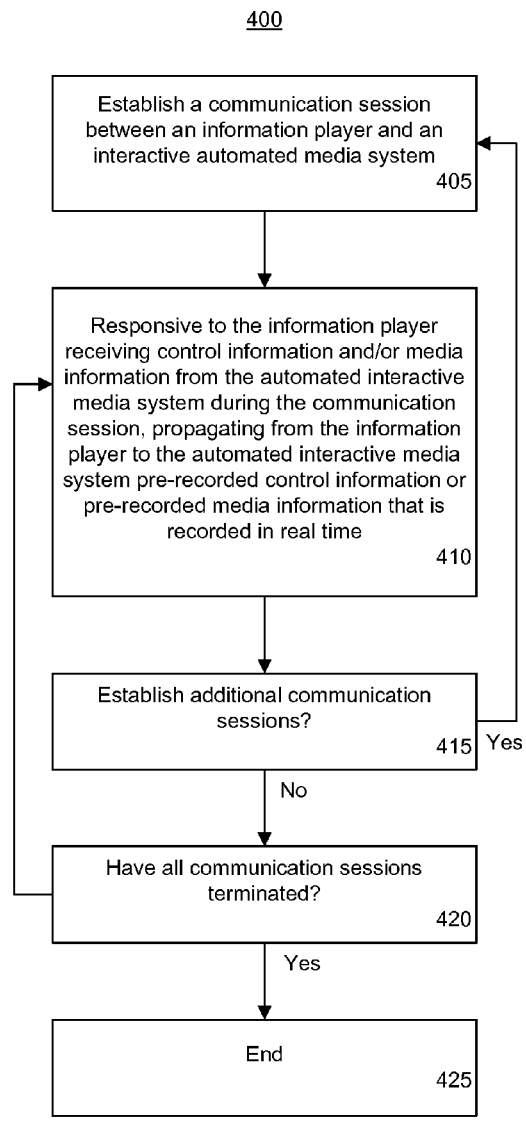
FIG. 3
FIG. 4

CREATION AND USE OF TEST CASES FOR AUTOMATED TESTING OF MEDIA-BASED APPLICATIONS

BACKGROUND OF THE INVENTION

1. Field of the Invention

The present invention relates to automated testing of media based applications.

2. Background of the Invention

Automatic speech recognizers (ASRs) and text to speech (TTS) synthesizers are speech resources commonly implemented in automated interactive speech systems, for example in automated voice response systems used in telephone call centers. Speech systems implementing ASRs and TTS can be relatively complex and it is common for prototype versions of such systems to contain multiple software flaws. Accordingly, speech systems are rigorously tested during development in an attempt to identify and correct such flaws before being released as deliverable products.

Automated test suites are sometimes implemented to perform development testing on speech systems. However, currently available test suites suffer from a number of drawbacks. For instance, in addition to being very time consuming, creation of the automated test suites requires specialized resources and skills. For example, specialized hardware is typically required to place telephone calls to an interactive speech system. Moreover, a myriad of automated call driver applications must be specially developed in order to test a full range of operational scenarios. Unfortunately, such applications oftentimes must be rewritten when a speech system is upgraded to include new technologies and modalities. Accordingly, there is a need for a solution that implements testing of automated interactive speech systems in an efficient manner.

SUMMARY OF THE INVENTION

The present invention relates to a method for testing an automated interactive media system. The method can include establishing a communication session with the automated interactive media system. In response to receiving control and/or media information from the automated interactive media system, pre-recorded control and/or media information can be propagated to the automated interactive media system. The pre-recorded control and/or media information can be recorded in real time.

The present invention also relates to a method for creating a test case for testing automated interactive media systems. The method can include recording media information exchanged between a media device and an interactive automated media system during a communication session. In addition, control information exchanged between the media device and the interactive automated media system also can be recorded during the communication session.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

FIG. 3 is a flow chart illustrating a method of generating a test case in accordance with another embodiment of the present invention.

FIG. 4 is a flow chart illustrating a method of testing an interactive speech system in accordance with another embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to capturing control information and media information that are sent to an automated interactive media system. The information that is captured can be information that is exchanged between a media device and the automated interactive media system during an interactive communication session. The information can be played back to perform automated testing of that or other automated interactive media systems. Accordingly, the present invention eliminates the need to develop specialized media driver applications to perform the automated testing.

Figure 1:
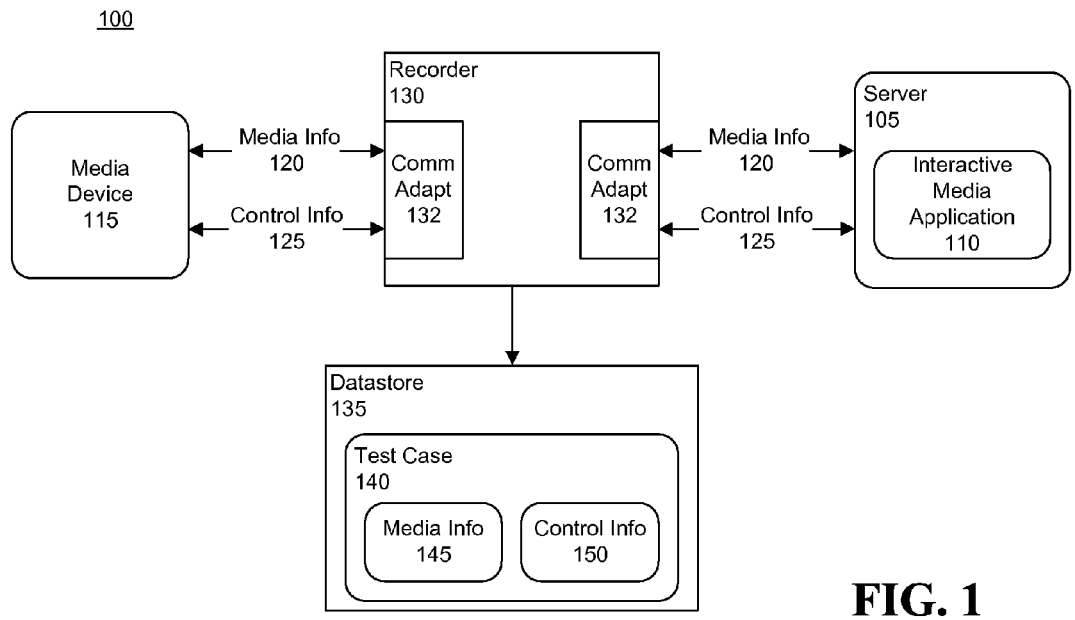
FIG. 1 depicts an interactive media system in accordance with one embodiment of the present invention.

FIG. 1 depicts an interactive media system (hereinafter "system") 100 in accordance with one embodiment of the present invention. The system 100 can include a server 105 that comprises an automated interactive media application (hereinafter "media application") 110, for example an interactive speech application. As such, the server 105 can establish an interactive communication session with a media device 115. The interactive communication session that is established can be, for example, a voice over internet protocol (VOIP) session. Both media information 120 and control information 125 can be communicated between the media application 110 and the media device 1 15. By way of example, the control information 125 can include session initiation protocol (SIP) messages that contain session description protocol (SDP) records, but the invention is not limited in this regard.

The media device 115 can be, for example, a telephone, a mobile telephone, a personal digital assistant, a computer, a multimedia player or any other device which can send and receive media information 120 and control information 125 to/from the media application 1 10. In one arrangement, the media device 115 can include a communication bridge to bridge communications between an IP network and media devices which do not natively support IP. The bridge can be, for example, a network appliance, an application executing on a computer, or any other system or device suitable for bridging communications between the IP network and a media device.

The system 100 also can include a recorder 130. The recorder 130 can include one or more communication adapters 132 for communicatively linking the recorder 130 to the media application 110 and the media device 115 in a manner suitable for the recorder 130 to receive the media information 120 and the control information 125 exchanged between the media application 110 and the media device 115 without disrupting such communications. For example, the recorder 130 can include a network adapter and/or a communications port that can connect to a communication line carrying the information 120, 125. In one arrangement, the recorder 130 can be connected in series with the communication line. In another arrangement, the recorder 130 can be installed with the server 105 and an application executing on the server 105 can forward all communications between the media device 115 and the media application 110 to the recorder 130. Still, the recorder 130 can be communicatively linked to the media device 115 and the media application 110 in any other suitable manner and the invention is not limited in this regard.

To generate a test case 140 which can be used to test an automated interactive media system, the recorder 130 can capture the media information 120 and the control information 125 as such information is propagated during a live communication session between the media device 115 and the media application 110 (i.e. in real time). From the description records, the recorder 130 also can identify which of the media device 115 and the media application 110 is the source and which is the destination for the information 120, 125 being exchanged. In addition, the description records can identify the type of media information 125 being propagated.

Further, the recorder can manipulate one or more of the description records, for example SDP records, contained in the control information 125 that is to be recorded. For instance, the description records can be manipulated to identify on the recorder 130, or on a player that may play the test case 140, media targets for the recorded information. A media target can be, for example, the media application 110. In addition, the description records can be modified to identify ports through which the media information 120 and the control information 125 may be exchanged.

As part of the recording process for the test case 140, the recorder 130 can receive the media information 120 and store corresponding media information 145 to a datastore 135. Similarly, the recorder 130 can receive the control information 125 and store corresponding control information 150 to the datastore 135. In one arrangement, the media information 145 and the control information 150 can be stored in a single recording track in an order in which the information was received by the recorder 130. In another arrangement, the media information 145 can be stored to a first recording track and the control information 150 can be stored to a second recording track. Temporal information can be stored with both the media information 145 and the control information 150 to facilitate playback of the information with appropriate timing. The temporal information can include, for example, time stamps, elapsed time, sequence information, and the like. Synchronization and/or additional control information also can be stored.

Figure 2:
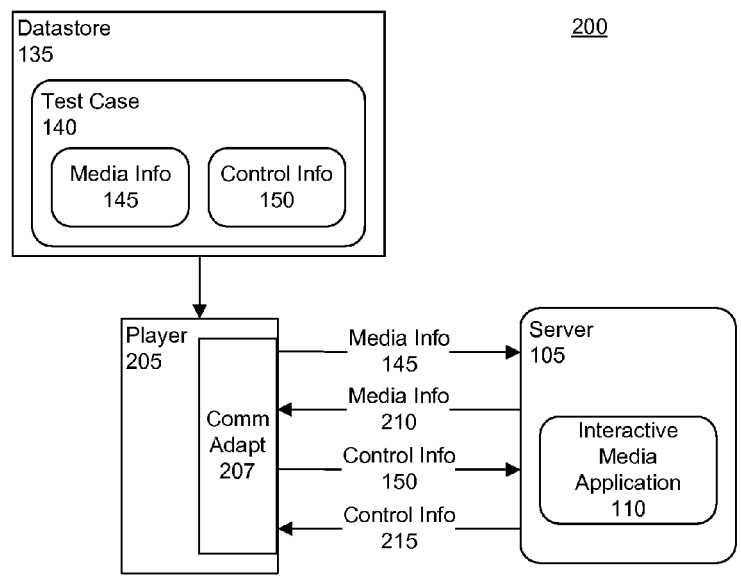
FIG. 2 depicts an interactive media system in accordance with another embodiment of the present invention.

FIG. 2 depicts an automated interactive media system 200 in accordance with another embodiment of the present invention. The interactive media system can comprise an information player (hereinafter "player") 205. In one arrangement, the player 205 can be included in a device comprising the recorder. In another arrangement, the recorder and the player 205 each can comprise separate devices. The player 205 can include a communication adapter 207 suitable for communicatively linking the player 205 to the media application 110. The communication adapter 207 can be, for example, a network adapter and/or a communications port.

The player 205 can use the test case 140 to test the media application 110, or another media application. For example, the player 205 can initiate a dialog sequence with the media application 110 by propagating a first portion of the recorded media information 145 and/or the control information 150 contained in the test case 140. During the dialog, the player 205 can propagate the information 145, 150 to the media application 110 in a manner that repeats the sequence of media and control information as originally propagated by the media device in the live communication session from which the test case 140 was generated. For instance, the player 205 can access the test case 140 from the data store 135 and execute messages contained in the recorded control information 150. The player 205 also can stream to the media application 110 portions of the recorded media information 145 which correspond to media information previously propagated by the media device. If the media information 145 and control information 150 are stored on separate tracks on the data store 135, the player 205 can receive data from both tracks.

The recorded media information 145 can be streamed in the sequence and temporal position of the original live communication session at the time of the recording. The player 205 also can send to the media application 110 portions of the recorded control information 150 that correspond to control information originally generated by the media device. The stored temporal, synchronization and/or additional control information can be processed by the player 205 to determine when to retrieve various portions of the information 145, 150 and propagate such information 145, 150 to the media application 110.

In response to receiving the information 145, 150 sent by the player 205, the media application 110 can send back to the player media information 210 and/or control information 215. The player 205 can receive such information 210, 215 and determine whether the information 210, 215 matches information originally sent by the media application 110 when the test case 140 was recorded. If the information 210, 215 does not match corresponding responses generated by the media application 110 in the test case 140, the player 205 can generate an error message. If, however, the information 210, 215 does match the corresponding responses generated by the media application 110 in the test case 140, the player 205 can select a next portion of the information 145, 150 from the test case 140 and propagate such information to the media application 110. The selected portion can correlate to the information that was originally sent to the media application 110 during the live session in response to receiving the information 210, 215. Such process can continue with exchanges between the player 205 and the media application 110 until the test sequence has completed.

Rather than executing a single test case 140, a plurality of test cases can be simultaneously executed by the player 205 to establish multiple simultaneous communication sessions with the media application 110. In one example, the test cases can be executed in a single batch. Such testing can be implemented to perform load testing of the media application 110. The test cases also can be sequentially executed multiple times to establish a new communication session immediately after a previous communication session has ended. Testing in this manner can be implemented to perform long term testing of the server 105 and/or the media application 110. Further, the flexibility to run multiple sequential test cases can allow a developer to initiate an automatic test sequence which runs without need for user intervention.

FIG. 3 is a flow chart illustrating a method 300 of generating a test case in accordance with another embodiment of the present invention. At step 305, during a live communication session between a media device and an automated interactive media system, media information exchanged between the media device and the automated media system can be recorded. In one arrangement, the media information can be recorded to a first recording track.

Proceeding to step 310, during the live communication session, control information exchanged between the media device and the interactive automated media system can be recorded. In one arrangement, the control information can be recorded to the same recording track where the media information is recorded. In such an arrangement, the media and control information can be sequentially recorded as such information is received by a device which is performing the recording function. In another arrangement, the control information can be recorded to a second recording track.

In the arrangement in which the media and control information are recorded to separate tracks, the process can continue to step 315 where temporal information, synchronization information and/or additional control information also can be recorded. The temporal information, synchronization information and/or additional control information can later be processed to facilitate playback of respective portions of the media and control information at the appropriate times. If the media and control information are recorded to a single track, recording of the temporal information, synchronization information and/or additional control information may not be needed.

Referring to steps 320 and 325, the recording process can continue until after the communication session has terminated.

FIG. 4 is a flow chart illustrating a method 400 of testing an interactive media system in accordance with another embodiment of the present invention. At step 405, a communication session can be established between an information player and an interactive automated media system. At step 410, responsive to the information player receiving control information and/or media information from the automated interactive media system during the communication session, pre-recorded control information and/or pre-recorded media information that was recorded in real time can be propagated from the information player to the automated interactive media system.

Referring to step 415, if additional communication sessions are to be established, the process can proceed back to step 405 to establish such communication sessions. Referring to steps 420 and 425, the process can end after all communication sessions have terminated.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method for testing an automated interactive media system comprising:
    establishing a first communication session between an information player and the automated interactive media system; and
    responsive to the information player receiving control information or media information from the automated interactive media system during the first communication session, propagating from the information player to the automated interactive media system at least one set of information selected from the group consisting of pre-recorded control information that was recorded in real time and pre-recorded media information that was recorded in real time.

2. The method according to claim 1, further comprising
    retrieving the pre-recorded control information from a first recording track of a datastore and
    retrieving the pre-recorded media information from a second recording track of the datastore.

3. The method according to claim 1, wherein
    the at least one set of information is from a prior communication session between a media device and a media application.

4. The method according to claim 1, further comprising:
    establishing a second communication session between the information player and the automated interactive media system; and
    responsive to the information player receiving control information or media information from the automated interactive media system during the second communication session, propagating from the information player to the automated interactive media system at least a second set of information selected from the group consisting of pre-recorded control information that was recorded in real time and pre-recorded media information that was recorded in real time.

5. The method according to claim 4, wherein
establishing the second communication session comprises establishing the second communication session while the first communication session is still established.

6. The method according to claim 4, wherein
establishing the second communication session comprises establishing the second communication session immediately after the first communication session has ended.

7. A method for creating a test case for testing automated interactive media systems comprising:
during a communication session between a media device and an interactive automated media system:
recording media information exchanged between the media device and the interactive automated media system; and
recording control information exchanged between the media device and the interactive automated media system.

8. The method according to claim 7, wherein
recording the control information comprises recording the control information to a recording track in which the media information is recorded.

9. The method according to claim 7, wherein
recording the media information comprises recording the media information to a first recording track and recording the control information comprises recording the control information to a second recording track.

10. The method according to claim 7, further comprising
recording at least one form of information related to the media and control information, the form of information selected from the group consisting of temporal information and synchronization information.

* * * * *